Patented May 11, 1943

2,318,745

UNITED STATES PATENT OFFICE 2,318,745

RUBBER COMPOUNDING

Theodore A. Bulifant, Hackensack, N. J., assignor, by mesne assignments, to Allied Chemical & Dye Corporation, a corporation of New York No Drawing. Application November 13, 1939, Serial No. 304,166

2 Claims. (Cl. 260—759)

This invention relates to the manufacture of vulcanized rubber and more particularly to a novel rubber compounding material. This application claims a species of the generic invention disclosed and claimed in my copending application Serial No. 304,167 filed on the same day as this application.

In the manufacture of vulcanized rubber products it is customary to mix thoroughly rubber, sulfur, vulcanizing accelerator and other ingredients, such as rubber softener, fillers, such as carbon black, zinc oxide, clays, etc. on the rolls of a rubber mill and then to subject the resultant rubber mix to elevated temperatures to effect vulcanization. Heretofore various rubber softeners such as pine oil, pine tar, asphaltic hydrocarbons, coal and water gas tar distillate oils, rosin oil and resins such as paracoumarone resin, and the like, have been added to the rubber mix for the purpose of dispersing the fillers used in rubber compounding. Cowdery and Bulifant Patent No. 1,793,161 of February 17, 1931 discloses a coal tar oil possessing particularly valuable properties as a softening and dispersing agent in rubber compounding. The invention claimed herein may be considered as an improvement on the invention disclosed and claimed in said Patent No. 1,793,161.

The rubber softener of United States Patent No. 1,793,161 is customarily made by fractionally distilling creosote oil from which tar bases have been extracted. While the rubber softener of United States Patent No. 1,793,161 has found extensive commercial use and is regarded as a reasonably satisfactory softener, it has been recognized for some time that in the use of this softener, considerable care must be exercised with respect to the amount thereof incorporated in the rubber mix and other constituents added to the mix in order that successive batches of the mix made by blending like constituents in like proportions result in the production of vulcanized rubber products having substantially the same physical properties. In other words, variations in vulcanized rubber products made from successive rubber mixes containing sulfur vulcanizing agents, accelerators and softeners in substantially the same proportions has at times been attributed to variations in the chemical composition of the softener and there have been cases where it has not been found possible to readily reproduce desired vulcanized rubber products.

It is an object of the invention to provide a novel rubber compounding material which promotes the production of readily reproducible vulcanized rubber stock of improved properties.

It is another object of the invention to provide a rubber compounding material which activates the rate of cure of rubber mixes containing customary amounts of sulfur and vulcanizing accelerator so that the time required for effecting vulcanization of the rubber to a high state of cure is reduced. Other objects and advantages will appear hereinafter.

I have discovered that the incorporation in a rubber mix of a rubber softener constituted of a coal tar distillate having a specific gravity of above about 1.06 at 38° C., a boiling point above about 200° C. which is free from crystalline material at about 25° C. contains from 3 to 10%, preferably from 3 to 7%, of tar bases boiling above 210° C. results in an improved rubber product. Further, use of this softener in successive batches in like amounts results in like vulcanized rubber products.

The rubber softener may be made by fractionating creosote oil from which the tar bases have not been extracted to produce an oil having the physical properties and chemical composition hereinabove mentioned or it may be made by adding to a coal tar distillate having the physical properties hereinabove mentioned, tar bases containing the pyridine nucleus boiling above 210° C. such as quinoline, isoquinoline, quinaldine and other homologs, individually or in admixture in amount to produce the desired tar base content in the oil. As illustrative of the rubber softener of the invention there may be employed a fraction obtained by the distillation of creosote oil having a specific gravity at 38° C. of from 1.06 to 1.15, a minimum flash point of 100° C., a maximum free carbon content of .5%, a tar base content of from 3 to 10% and the following distillation characteristics:

Per cent distilled off at 210° C__maximum__   1
Per cent distilled off at 235° C__maximum__  10
Per cent distilled off at 300° C_____ 30 to 60

The rubber softener containing from 3 to 10% by weight of tar bases, preferably from 3 to 7%, I have found, functions not only as a softening and dispersing agent for dispersing fillers and other ingredients in rubber mixes, but also activates vulcanizing accelerators such as accelerators of the acid type, e. g. mercaptobenzothiazole, and accelerators of the basic type, e. g. the aldehyde-amine type and also the guanidine derivative type, e. g. diphenyl guanidine and diorthotolylguanidine, so that the time for effecting vulcanization of the rubber to a high state of cure is reduced. Furthermore, the softening agent of this invention permits the production of readily reproducible vulcanizable rubber products of improved properties, e. g. greater tensile strength. In some cases the use of the rubber softener of this invention permits reduction of the amount of the relatively expensive vulcanizing rubber accelerator employed with consequent reduction of the total cost of the materials constituting the mix without detrimentally affecting the properties of the cured stock.

The amount of rubber softener of my invention containing from 3 to 10%, preferably 3 to 7% of the tar bases incorporated in the rubber mix, may vary; preferably an amount or rubber softener is added such that the rubber mix contains from about .1 to .6% tar bases, based on the weight of the rubber.

As illustrative of the incorporation of coal tar distillate rubber softener containing from 3 to 10% by weight of tar bases in rubber mixes, the following examples are given:

EXAMPLE I

A composition suitable for the manufacture of inner tube stocks is as follows, parts being by weight:

| | |
|---|---|
| Smoked sheets (rubber) | 100 |
| Blend of coal tar distillate and 3% of tar bases | 5 |
| Whiting | 50 |
| Zinc oxide | 5 |
| Stearic acid | 1 |
| Sulfur | 3 |
| Mercaptobenzothiazole (Captax) | .6 |

The coal tar distillate of the above example was a limpid fraction of creosote oil from which tar bases had been extracted, free from crystalline material at 25° C., having a specific gravity of 38° C. of about 1.06 to 1.15, a flash point of 110° C., a free carbon content of 0.5%, and the following distillation characteristics:

| | |
|---|---|
| Per cent distilled off at 210° C | 0 |
| Per cent distilled off at 235° C | 1.1 |
| Per cent distilled off at 300° C | 56.7 |
| Per cent distilled off at 355° C | 81 |

The tar bases blended with this coal tar distillate were a fraction of bases derived from coal tar which fraction was constituted chiefly of homologs of quinoline and isoquinoline, mainly dimethyl and trimethyl substitutes. The fraction had an initial boiling point of about 228° C. and a decomposition point of about 362° C.

The ingredients of the rubber mix were assembled and milled in the customary manner and batches of the milled product were cured for 10, 20, 30, 40 and 50 minutes at a temperature of 281° F., corresponding to a steam pressure of 35 pounds per square inch. As hereinbelow discussed, the cured stocks were subjected to tensile, aging and hardness tests.

EXAMPLE II

The following is illustrative of a composition suitable for manufacture of tire tread stock, parts being by weight:

| | |
|---|---|
| Smoked sheets (rubber) | 100 |
| Carbon black | 43 |
| Zinc oxide | 7.5 |
| Coal tar distillate containing 5.8% of tar bases | 5 |
| Stearic acid | 4 |
| Antioxidant | 1.25 |
| Sulfur | 3 |
| Mercaptobenzothiazole (Captax) | .6 |

The coal tar distillate of Example II was a limpid fraction of creosote oil, free from crystalline material at 25° C., having a specific gravity at 38° C. of about 1.085, a free carbon content of .1%, containing 5.8% by weight of tar bases boiling above 210° C., and possessing the following distillation characteristics:

| | |
|---|---|
| Per cent distilled off at 210° C | 0 |
| Per cent distilled off at 235° C | 5.8 |
| Per cent distilled off at 270° C | 36.9 |
| Per cent distilled off at 300° C | 52.5 |
| Per cent distilled off at 315° C | 59.5 |
| Per cent distilled off at 355° C | 79.7 |

The ingredients of the rubber mix were assembled and milled in the customary manner and batches of the milled product were cured for 25, 35, 45, 60, 75 and 90 minutes at a temperature of 274° F. corresponding to a steam pressure of 30 pounds per square inch.

The cured stocks of the above examples were subjected to tensile, aging and hardness tests. The results of these tests showed the stocks to possess satisfactory properties. For purposes of comparison there are given below the results of the tensile and hardness tests on the cured unaged stocks of the examples and on cured unaged stocks prepared similarly to those of the examples except that the softener employed contained no tar bases.

A. Stocks of Example I

| Cured | Tensile stress (lbs. per sq. in.) at elongation of— | | Tensile strength (lbs. per sq. in.) | Per cent elongation at breaking point | Hardness (Shore) |
|---|---|---|---|---|---|
| | 300% | 500% | | | |
| 10 minutes | 150 | 400 | 1,480 | 750 | 44 |
| 20 minutes | 230 | 640 | 2,600 | 760 | 50 |
| 30 minutes | 260 | 680 | 2,690 | 720 | 53 |
| 40 minutes | 260 | 680 | 2,620 | 720 | 55 |
| 50 minutes | 260 | 680 | 2,570 | 720 | 56 |

B. Stocks prepared similarly to those of Example I, except that the softener contained no tar bases

| Cured | Tensile stress (lbs. per sq. in.) at elongation of— | | Tensile strength (lbs. per sq. in.) | Per cent elongation at breaking point | Hardness (Shore) |
|---|---|---|---|---|---|
| | 300% | 500% | | | |
| 10 minutes | 120 | 340 | 1,200 | 720 | 42 |
| 20 minutes | 190 | 560 | 2,500 | 750 | 49 |
| 30 minutes | 230 | 590 | 2,580 | 740 | 50 |
| 40 minutes | 230 | 610 | 2,450 | 740 | 53 |
| 50 minutes | 230 | 610 | 2,400 | 740 | 54 |

C. Stocks of Example II

| Cured | Tensile stress (lbs. per sq. in.) at elongation of— | | Tensile strength (lbs. per sq. in.) | Per cent elongation at breaking point | Hardness (Shore) |
|---|---|---|---|---|---|
| | 300% | 500% | | | |
| 25 minutes | 1,100 | 2,500 | 3,430 | 620 | 60 |
| 35 minutes | 1,325 | 2,850 | 3,940 | 630 | 62 |
| 45 minutes | 1,500 | 3,100 | 4,020 | 610 | 65 |
| 60 minutes | 1,575 | 3,350 | 4,110 | 600 | 66 |
| 75 minutes | 1,800 | 3,500 | 4,230 | 570 | 68 |
| 90 minutes | 1,900 | 3,600 | 4,280 | 550 | 69 |

D. *Stocks prepared similarly to those of Example II, except that the softener contained no tar bases*

| Cured | Tensile stress (lbs. per sq. in.) at elongation of— | | Tensile strength (lbs. per sq. in.) | Per cent elongation at breaking point | Hardness (Shore) |
|---|---|---|---|---|---|
| | 300% | 500% | | | |
| 25 minutes | 860 | 2,000 | 2,990 | 630 | 60 |
| 35 minutes | 1,075 | 2,425 | 3,400 | 640 | 61 |
| 45 minutes | 1,325 | 2,775 | 3,830 | 630 | 62 |
| 60 minutes | 1,450 | 3,100 | 4,010 | 605 | 64 |
| 75 minutes | 1,500 | 3,400 | 3,690 | 580 | 65 |
| 90 minutes | 1,575 | 3,200 | 3,760 | 540 | 66 |

It will be noted that the incorporation of coal tar distillate containing from 3 to 10% of tar bases in the rubber mixes resulted in vulcanized stocks of greater tensile strength and hardness and the stocks required greater stress to produce a given elongation than the vulcanized stocks compounded with softeners containing no tar bases. Furthermore, coal tar distillate softeners containing tar bases promote reduction of the vulcanizing time necessary for obtaining satisfactory cure of the rubber and impart improved wearing qualities to the vulcanized stock. Thus the stock of Example II, after vulcanization for 90 minutes, suffered an abrasion loss of 126 units, while the stock prepared similarly, except that the softener employed contained no tar bases, suffered an abrasion loss of 146 units. The abrasion tests were carried out using the well known duPont abrader by the method generally used in the trade, the units of abrasion loss being calculated by the following formula:

$$V = \frac{g \times 60}{s.g. \times m \times HP}$$

in which $g$=grams lost by rubber sample during test; $s.g.$=specific gravity of sample; $m$=duration of test in minutes; and $HP$=horse power consumed.

This invention, it will be noted, renders it possible to produce rubber compositions which result in rubber articles possessing greater wearing qualities than articles heretofore produced and is particularly applicable to the manufacture of dark colored rubber products such as tire treads, tire tubes, rubber heels, rubber soles, and various mechanical rubber goods where the improved qualities imparted by this invention are desirable.

The tensile and hardness values given herein were determined in accordance with tests prescribed by The American Society for Testing Materials.

I claim:

1. The process of compounding rubber which comprises mixing with the rubber sulfur vulcanizing agent, an activatable vulcanizing accelerator and a rubber compounding material constituted of a blend of coal tar distillate and from 3 to 10 per cent by weight, based on the weight of the distillate, of tar bases containing the pyridine nucleus capable of activating said accelerator, said tar bases boiling above about 210° C., said distillate being substantially free from crystalline material at 25° C., having a specific gravity of not less than 1.06 at 38° C. and boiling above 200° C., said blend being employed in amount such that the rubber contains from .1 to .6 per cent of said tar bases based on the weight of the rubber hydrocarbon, and vulcanizing the rubber.

2. A process of compounding rubber which comprises mixing with the rubber sulfur vulcanizing agent, an activatable vulcanizing accelerator and rubber compounding material constituted of a blend of coal tar distillate rubber softener and from 3 to 7 per cent by weight, based on the weight of the distillate, of tar bases containing the pyridine nucleus capable of activating said accelerator, said fraction being constituted chiefly of homologs of quinoline and isoquinoline, said distillate being substantially free from crystalline material at 25° C., having a specific gravity of not less than 1.06 at 38° C. and boiling above 200° C., said blend being employed in amount such that the rubber contains from .1 to .6 per cent of said tar bases based on the weight of the rubber hydrocarbon, and vulcanizing the rubber.

THEODORE A. BULIFANT.